(12) United States Patent
Maurya

(10) Patent No.: US 11,470,144 B1
(45) Date of Patent: Oct. 11, 2022

(54) OPTIMIZATION-BASED POOL PROTECTION FOR A CLOUD PROVIDER NETWORK

(71) Applicant: Amazon Technologies, Inc., Seattle, WA (US)

(72) Inventor: Abhinav Maurya, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 15 days.

(21) Appl. No.: 17/216,431

(22) Filed: Mar. 29, 2021

(51) Int. Cl.
| | |
|---|---|
| *H04L 67/10* | (2022.01) |
| *G06F 9/455* | (2018.01) |
| *G06F 9/50* | (2006.01) |
| *H04L 43/08* | (2022.01) |
| *H04L 9/40* | (2022.01) |

(52) U.S. Cl.
CPC .......... *H04L 67/10* (2013.01); *G06F 9/45558* (2013.01); *G06F 9/5077* (2013.01); *H04L 43/08* (2013.01); *H04L 63/102* (2013.01); *G06F 2009/45591* (2013.01); *G06F 2009/45595* (2013.01)

(58) Field of Classification Search
CPC ....... H04L 67/10; H04L 43/08; H04L 63/102; G06F 9/45558; G06F 9/5077; G06F 2009/45591; G06F 2009/45595
See application file for complete search history.

(56) References Cited

U.S. PATENT DOCUMENTS

| | | | | |
|---|---|---|---|---|
| 2013/0086236 A1* | 4/2013 | Baucke | ................... | H04L 45/50 709/223 |
| 2013/0173795 A1* | 7/2013 | McPherson | ........... | H04L 63/168 709/225 |
| 2014/0101306 A1* | 4/2014 | Murgia | ................ | H04L 47/125 709/224 |

\* cited by examiner

*Primary Examiner* — Frantz B Jean
(74) *Attorney, Agent, or Firm* — Nicholson De Vos Webster & Elliott LLP

(57) ABSTRACT

Techniques for optimization-based pool protection for a cloud provider network are described. An exemplary method includes receiving historical usage data of virtual machine instances of a capacity pool of a cloud provider network for each account of a plurality of accounts of the cloud provider network, generating a linearly extrapolated usage, based at least in part on an extrapolating parameter, for each account based at least in part on respective usage percentiles of the virtual machine instances from the historical usage data, determining a usage of the virtual machine instances for each account based at least in part on the linearly extrapolated usage for a same extrapolating parameter value, receiving, by the cloud provider network, a request to launch a computing resource for an account, determining a usage limit for the account based at least in part on the usage for that account, and launching the computing resource when a requested usage for the computing resource is less than or equal to the usage limit and not launching the computing resource when the requested usage for the computing resource is greater than the usage limit.

20 Claims, 9 Drawing Sheets

| TABLE OF SYMBOLS 400 | |
|---|---|
| Symbol | Example explanation |
| $u_{i,k}$ | Usage of account $i$ at a snapshot index $k$, input data. |
| $c_k$ | Capacity of pool being protected at a snapshot index $k$, input data. |
| $H$ | Historical period equivalent to $H$ snapshots (e.g., a few weeks) whose data is used to estimate usage percentiles. This duration is used to calculate linear extrapolation parameters $m_i$ and $w_i$ input to the optimization. |
| $m_i$ | Linear slope for account $i$ calculated from usage percentiles of account $i$. |
| $w_i$ | Linear intercept for account $i$ calculated from usage percentiles of account $i$. |
| $T$ | Planning interval lasting $T$ snapshots (e.g., a few hours) (e.g., the pool's rebuild window) for which budgets are being set. Planning interval moves as a sliding window through the period (e.g., day) immediately following the historical period $H$. |
| $q$ | First snapshot index in the planning interval. $T \in \{q, \ldots, q + T - 1\}$ |
| $d_i$ | Maximum additional usage for pool resources demanded by account $i$ in the planning interval, latent. $d_i = max_t u_{i,t} - u_{i,q}$ where the maximum is over usages in the planning interval. |
| $\hat{d}_i$ | Usages in the planning interval are not observed, since planning interval is in the immediate future. Therefore, $d_i$ appears as a forecast $\hat{d}_i$ in the optimization. |
| $b_i$ | Usage budget of account $i$ for the planning interval, determined by the optimization. |
| $l_i$ | Usage limit of account $i$ for the planning interval, determined by the optimization. |
| $b_{min}$ | Minimum budget allowed in the optimization, e.g., 0. |
| $l_{min}$ | Minimum usage limit allowed in the optimization, e.g., 20. |
| $p_i(x)$ | $x^{th}$ percentile for account $i$'s usage from historical period $H$ |
| $y_i$ | 'Extrapolated' percentile for account $i$'s usage, not an actual percentile from the usage distribution |
| $e$ | Free parameter in the optimization that traces out the tail percentile extrapolation line |
| $e_{min}$ | Minimum allowed value of $e$ |
| $e_{max}$ | Maximum allowed value of $e$ |
| $ds_i$ | Drain score of account $i$ at the start of the planning interval, either a real value in the interval (0,1) or a binary indicator $\{0, 1\}$, e.g., assume 0 unless more informative scores become available as side information |
| $N_{iK}$ | Index set of $K$ nearest neighbors of account $i$ |
| $t_i$ | Account $i$'s truncated expected budget utilization (TEBU). E.g., the additional usage demanded by account $i$ truncated to budget $b_i$. |
| $X$ | Set of historical planning intervals representative of usage demands in the planning interval that budgets are being set for. |
| $d_{i,k}$ | Maximum additional usage for pool resources demanded by account $i$ in a historical interval $k$ in $X$ |

FIG. 4

OPTIMIZATION-BASED POOL PROTECTION FOR A CLOUD PROVIDER NETWORK

BACKGROUND

Many companies and other organizations operate computer networks that interconnect numerous computing systems to support their operations. For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine is a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which:

FIG. 4 illustrates embodiments of the symbols and corresponding explanations that may be utilized by an admission control service.

DETAILED DESCRIPTION

Figure 1:
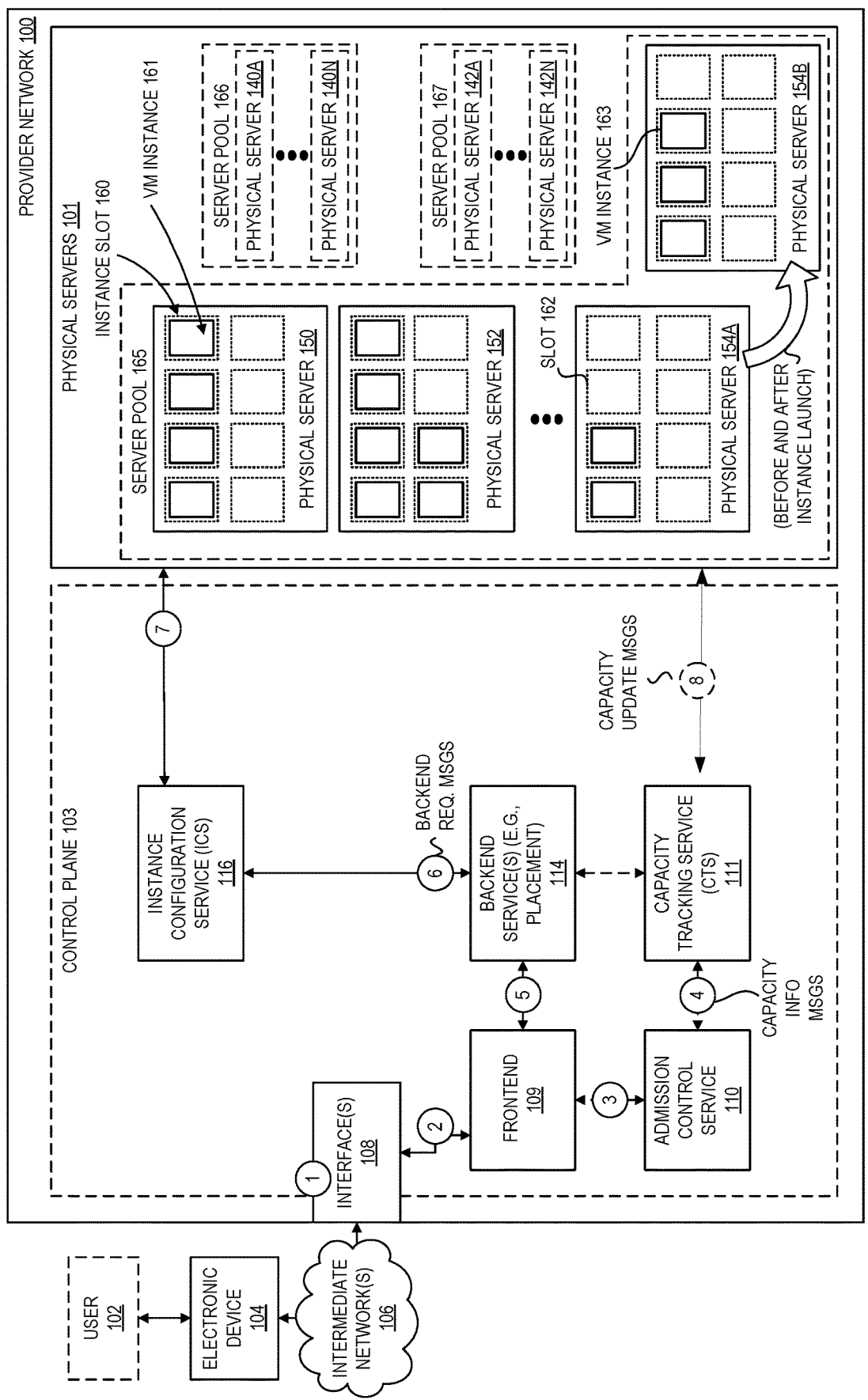
FIG. 1 is a diagram illustrating an environment that enables better admission control for requests to launch computing resources of a service provider network.

Given account-level server pool usage data for a time period (e.g., the past few weeks) for a plurality of accounts, and a server pool's current effective free capacity, embodiments herein allow for setting optimal usages per account (e.g., user) to protect the server pool for a certain (e.g., shorter) time period, for example, the server pool's rebuild time period (e.g., the time horizon of a few hours). In particular, a launch request is allowed or denied by the systems and/or methods disclosed herein. Embodiments herein improve service availability via pool protection.

Cloud provider networks allow customers to access and use many types of resources (e.g., computing resources such as virtual machine (VM) instances and containers, storage, or network) of a server pool. Although a cloud provider may desire to satisfy as many customer requests as possible by giving them the resource they requested, the cloud provider network can receive more requests for a particular type of resource than it is possible to satisfy without hitting a depletion threshold for an available (e.g., currently unused) pool of that resource. Further, certain methods and/or systems proactively refuse customer requests (e.g., for an account) if they will make a server pool(s) unhealthy and/or reduce availability for other customer(s) using the pool. This may be referred to as strategic proactive insufficient capacity excepting (SPICEing), e.g., where SPICEing a few customers early on (e.g., in a pool build) can prevent severe loss of pool availability later on by preserving capacity for the typical needs of (e.g., most) customers.

In certain embodiments, each account is assigned a budget (e.g., a number of virtual machine instances) for their upcoming usage in a pool (e.g., budget based SPICEing). For example, with the launch request honored as long as it is within the usage budget and if it exceeds the budget, the request gets SPICEd. In one embodiment, (e.g., request-based admission control (RBAC)) budget(s) are recalculated for a certain time period (e.g., once per day), e.g., less than the time period of the server pool's usage data (e.g., the past few weeks) and/or more than the time period of the server pool's rebuild time (e.g., a few hours). Embodiments herein allow for budget(s) (e.g., cumulatively forming the budgets for a server pool) to be updated in shorter time period (e.g., every 10 minutes), for example, updated in response to (e.g., at the frequency of) an update of server pool capacity and/or usage data, e.g., the frequency at which a server pool capacity and usage snapshot data gets dumped. In one embodiment, budgets calculated using snapshot dump "i" (e.g., where i is an integer) stay constant until the next snapshot i+1 becomes available for recalculating budgets.

A first SPICEing mechanism for setting a budget is a request-based admission control (RBAC), e.g., where each account's usage in a pool is regulated by two budgets. In certain embodiments, the usage budget is set by linearly extrapolating two tail percentiles (e.g., $90^{th}$ percentile (p90) and $99^{th}$ percentile (p99)) of the historical usage distribution (e.g., over a time period, such as six months of historical data collected at ten minute intervals) to a hypothetical percentile (e.g., an extrapolated percentile above the highest tail percentile, e.g., extrapolated $160^{th}$ (e160), that captures the maximum usage that is to be allowed for the account before SPICEing it. In one embodiment, the request budget is set to a tail percentile (e.g., p99) and applied to each request in the inter-snapshot period during which it is active. In certain embodiments, RBAC is activated only when the pool is in safety stock mode, i.e., the pool's free capacity is below its safety stock target. In certain embodiments, pools are required to maintain safety stock to provide for capacity reservations, cyclical "on-demand instance" demand, etc.

A second SPICEing mechanism for setting a budget is pool draining detection (PDD), e.g., where PDD calculates a score per incoming request. In certain embodiments, if the score is greater than 1, the account is considered a pool drainer and all their requests are SPICEd, e.g., their budget set to 0 for a certain time period (e.g., the next 10 to 30 minutes). In certain embodiments, the score is a multiplication of three component scores: (i) pool contention, (ii) account saturation, and (iii) account abnormality In certain embodiments, the calculation of the score relies on the size of the request, pool metrics such as safety stock, the account's RBAC limit, etc. In one embodiment, PDD is activated only in pools exceeding a minimum size (e.g., total capacity >X instance slots where X is an integer) and/or only on certain subgroups of customers. In one embodiment, PDD takes into consideration the request size which allows request specific SPICEing decisions instead of rejecting all requests during the time the account is marked as a drainer.

A third SPICEing mechanism for setting a budget is curated limits, e.g., with this admission control mechanism being identical in its design to how the usage budget in RBAC is calculated except for the extrapolation parameters. In certain embodiments, the budget is calculated by extrapolating two tail percentiles (e.g., the $95^{th}$ percentile p95 and the $99^{th}$ percentile p99) to a hypothetical percentile (e.g., extrapolated percentile 190 (e190)). This is less conservative than RBAC usage limit because it is applied to requests even when the pool is not in safety stock. In one embodiment, curated limits apply to aggregate virtual processor (e.g., virtual central processing unit (vCPU)) usage across pools and therefore the connection to pool protection may be tenuous.

However, embodiments of RBAC, PDD, and curated limits fall into the realm of rule-based heuristics that make severe assumptions. For example, where RBAC and curated limits assume that the requests beyond the extrapolated limits (e.g., "e160" and "e190", respectively) should be denied. For example, where PDD assumes that the budget should be 0 when a handcrafted feature exceeds 1. In certain embodiments, none of these mechanisms adapt the budget depending on the current capacity of the pool and the usage increase forecasted for the time duration being budgeted for.

Embodiments herein are directed to an optimization-based pool protection (e.g., SPICEing mechanism) that carries out tail percentile extrapolation (see, e.g., FIG. 5) and obtains usage budgets as high as possible such that the account-level forecasted usage increase (capped at the account's budget and summed over all the accounts) does not exceed the capacity that can be disbursed for the duration the pool is being protected for, e.g., and addresses the aforementioned challenges, among others. This ensures that the extent of the extrapolation is supported by the current capacity conditions in the pool instead of being fixed at some predetermined extrapolated limits (e.g., "e160" and "e190", respectively as examples for RBAC and curated limits) in certain embodiments. Also, the budgets are not divided in a static manner among accounts or account clusters, e.g., instead, they are decided cognizant of the fact that cloud compute capacity is oversubscribed and that budgets need to be high enough such that a budget not likely to be used by one account is available to another account that might want to use it in certain embodiments.

Turning now to the Figures, FIG. 1 is a diagram illustrating an environment that enables better admission control for requests to launch computing resources of a service provider network. A user 102 operates an electronic device 104 or configures the electronic device 104 for communications with the provider network 100. The electronic device 104 communicates with the provider network 100 via one or more intermediate networks 106, such as the internet. A provider network provides users with the ability to use one or more of a variety of types of computing-related resources such as compute resources (for example, executing virtual machines (VMs) and/or containers, executing batch jobs, executing code without provisioning servers), data/storage resources (for example, object storage, block-level storage, data archival storage, databases and database tables, and so forth), network-related resources (for example, configuring virtual networks including groups of compute resources, content delivery networks (CDNs), Domain Name Service (DNS)), application resources (for example, databases, application build/deployment services), access policies or roles, identity policies or roles, machine images, routers and other data processing resources, and so forth. These and other computing resources may be provided as services, such as a hardware virtualization service that can execute compute instances, a storage service that can store data objects, and so forth. The users (or "customers") of multi-tenant provider networks 100 may utilize one or more user accounts that are associated with a customer account, though these terms may be used somewhat interchangeably depending upon the context of use. In this description, the admission control service 110 is handling requests for placement as the example of the request for a resource. Note the admission control service 110 can handle a variety of requests, including, but not limited to: requests for volumes hosted by an elastic block store service (referred to in various implementations as a cloud disks service, a managed disk service, a storage area network service, a persistent disk service, or a block volumes service); requests for VMs/ instances hosted by an elastic compute cloud service (referred to in various implementations as an elastic compute service, a virtual machines service, a computing cloud service, a compute engine, or a cloud compute service); requests for containers hosted by a container orchestration and management service (referred to in various implementations as a container service, cloud container service, container engine, or container cloud service); etc.

To provide these and other computing resource services, provider networks 100 often rely upon virtualization techniques. For example, virtualization technologies may be used to provide users the ability to control or utilize compute instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

A user can use an interface of the provider network 100 attempt to create, use, and/or configure aspects of virtualized computing resources that execute on at least one fleet 101 of physical servers. The physical servers in the fleet 101 of physical servers can be computer systems of various configurations that differ along one or more dimensions, such as number and type of processors, type and amount of memory, connectivity of the memory to the processor(s), number and type of network interfaces, number, and type of local storage devices (e.g., solid-state drives), number and type of hardware accelerators (e.g., graphics processing units), etc. In large-scale networks, there may be hundreds, thousands, or more physical servers, which may be located in multiple geographic locations.

The fleet 101 includes, but is not limited to, a server pool 165 including physical servers 150, 152, and 154 (shown before and after a launch as 154A and 154B), server pool 166 including physical servers 140A to 140N, and server pool 167 including physical servers 142A to 142N. Prior to any operations associated with the described compute instance launch, the state of the physical servers 150, 152, and 154A is as follows: physical server 150 is hosting several VM instances, including VM instance 161 in a VM instance slot 160. Similarly, physical servers 152 and 154 are shown currently hosting other VM instances in VM instance slots, where each server has some number of unused instance slots representing an amount of unused compute capacity of the server. Note that the fleet 101 may include physical servers with different amounts of capacity, and support for different types and sizes of virtualization computing resources. Further note that VM slots (for example, the VM instance slot 160) illustrated within the electronic devices (e.g., physical servers) 150, 152, and 154A may be logical representations of portions of capacity managed by a control plane 103 of the provider network 100. The electronic devices 150, 152, and 154A may or may not have a local concept of a slot and execute instances based on received configuration and launch instructions, as described below.

A capacity pool, as used herein, refers to a set of virtual machine instances, e.g., of the same type and within the same availability zone or edge location. A cloud provider network may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance families. An instance family may be characterized by its hardware type, computational resources (e.g., number, type, and configuration of central processing units (CPUs) or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, or a non-burstable or dedicated instance type that is allotted and guaranteed a fixed quantity of resources). Each instance family can have a specific ratio of processing, local storage, memory, and networking resources, and different instance families may have differing types of these resources as well. Multiple sizes of these resource configurations can be available within a given instance family, referred to as "instance types." Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

At the circle labeled "1," a user sends one or more messages to request launch an instance request on one or more physical servers, or with one or more pools of physical servers within a fleet of physical servers. Communications between the electronic device 104 and the provider network 100, such as the request specifying the request (e.g., placement), can be routed through interface(s) 108, such as through use of application programming interface (API) calls, via a console implemented as a website or application, and so forth. The interface(s) 108 may be part of, or serve as a frontend to, a control plane 103 of the provider network 100 that includes "backend" services supporting and enabling the services that may be more directly offered to customers, such as services that enable the ability of users to configure placement preferences and to launch instances within the fleet 101.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to an AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. An edge location can be an extension of the cloud provider network outside of the traditional region/AZ context. For example, an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the cloud provider network to provide low-latency resource access to customers on a global scale with a high degree of fault tolerance and stability.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

In some embodiments, a request includes information such as one or more of an account identifier of the requester, a slot type to use in a physical server (e.g., the type of compute resource such as a type of processor (CPU, GPU, etc.), an indication of a number of slots requested, a timestamp for the request, and/or a region that the server(s) should be in. For example, and as described in more detail hereinafter, a user might prefer that VM instances requiring a particular type of server-bound software license be clustered together on as few physical servers as possible within the user's fleet (for example, to minimize license costs), prefer that particular types of VM instances are clustered together for low-latency and other performance reasons, or prefer that other types of VM instances are spread across physical servers for redundancy purposes, or prefer other types of preferences or combinations thereof.

For example, a defined placement preference for clustering instances associated with a software license can be associated with a relatively high weighting for resource launches associated with a tag or other indication that the associated resource requires the particular software license. Thus, when evaluating candidate VM slots on physical servers, slots on servers already associated with the software license, and already executing other instances that require the same license, can be highly ranked compared to slots on servers that would require an additional license to be obtained. On the other hand, the placement process for launching a resource that does not require the software license may not apply the software license-related placement preference, or apply a low weight to the preference, while preferring one or more other preferences (for example, preferences associated with clustering resources for performance reasons or spreading the resources for redundancy purposes). As these examples illustrate, the placement decision generally can be based on any combination of (i) placement preferences specified by a user (and optional weights/prioritizations associated with each placement preference), (ii) properties associated with a launch request, and (iii) properties and state information associated with physical servers of a fleet of physical servers into which a resource is being launched.

At circle 2, a frontend 109 takes the request message(s) and forwards them to an admission control service 110 at circle 3. The admission control service 110 evaluates the request to determine whether the request should be denied (e.g., SPICEd) or allowed. In particular, the admission control service 110 may use one or more of the mechanisms described herein (e.g., optimization-based pool protection) to determine whether or not a request should be denied.

To make this decision, the admission control service 110 fetches capacity information from a capacity tracker service (CTS) 111, as indicated at circle "4" to gather information about the physical servers 101. This information may include one or more of: capacity for a slot type to use in a physical server, an indication of a number of slots free, a timestamp for the information, and/or a region information for the server(s) (e.g., what region(s) have what capacity). Additional side information such as predicted demand, effective free capacity in pools that can donate to the pool serving the launch request, etc. may also be provided by the CTS 111 and can be useful inputs in deciding to deny a request.

The admission control service 110 evaluates the launch request against the capacity information and, in some cases, may reject a request based on optimization-based pool protection (e.g., SPICEing mechanism). In cases where the admission control service 110 rejects a request for capacity, the frontend 109 and/or interface(s) 108 provide an indication of the reason for failure to the customer in certain embodiments. Otherwise, the admission control service 110 allows the request.

In some embodiments, e.g., in addition to optimization-based pool protection (e.g., SPICEing mechanism), the admission control service 110 utilizes one or more policies to help determine if a request should proceed. Exemplary policies include checking the requesting user's creditworthiness, whether the user has any limits imposed on the number of instances they can launch, or whether the request might lead to resource shortages within the fleet 101.

Assuming the admission control service 110 allows the request, at circle "5," the frontend 109 sends one or more messages to one or more backend services 114 (such as a placement service) to continue processing the request.

The backend service(s) 114 determines if it can satisfy the request based on data available to it. For example, using state indicating available instance slots on each physical server, which instances are on which physical servers, the configurations of those instances, etc. The fleet 101 may include numerous physical servers, each with varying properties and amounts of available capacity. In some embodiments, the backend service(s) 114 also send updated capacity usage information to the CTS 111, so that the CTS 111 can update its capacity information. The backend service(s) 114 may also alert the admission control service 110 of any decisions that are contrary to the recommendation (e.g., a request was allowed by the admission control service 110, but denied by the backend service(s) 114).

The backend service(s) 114 utilize an instance configuration service (ICS) 116 to launch an instance by sending messages to the ICS 116 to configure and launch the instance, as indicated at circle "6."

The ICS 116 receives the instruction to configure and launch an instance and causes the launch at circle "7.". In some embodiments, the ICS 116 performs a workflow to configure and launch an instance according to one or more parameters, such as the compute, memory, network, storage, or other configuration settings. The ICS 116 communicates with the physical server of the fleet 101 designated to host the instance, sending one or more messages to configure and launch the instance. For example, in some embodiments the ICS 116 causes an offload card (which may include one or more processors, a local memory, physical network interfaces, and so forth) that is a part of (e.g., coupled with) an electronic device of the fleet 101 to launch the compute instances. The offload card may implement a virtualization manager that can manage, for example, virtual machine compute instances that execute on a host electronic device, independent of a hypervisor or in combination with a hypervisor that executes using the traditional CPU(s) of the electronic device. For example, in some embodiments, the virtualization manager implemented by the offload card can instantiate and/or terminate virtual machines, thus eliminating the need for the hypervisor to perform these tasks, which can improve the performance of the virtual machines themselves due to not having to compete for resources with the hypervisor.

Alternatively, in some embodiments, the ICS 116 interacts with a hypervisor (for example, via a VM management server) to cause the compute instance(s) to be launched. In either case, the ICS 116 causes the physical server to create a virtual machine or other environment with the requested hardware configuration (for example, with access to a local solid-state drive, with two network interfaces, access to a local graphics accelerator, four cores, and 8 gigabytes of memory) and software configuration (executing a machine image that includes a Linux or other operating system, and so forth). Continuing the launch example in FIG. 1, the ICS 116 causes a VM instance 163 to be launched in slot 162 on physical server 154B (showing physical server 154A after launch).

Figure 2:
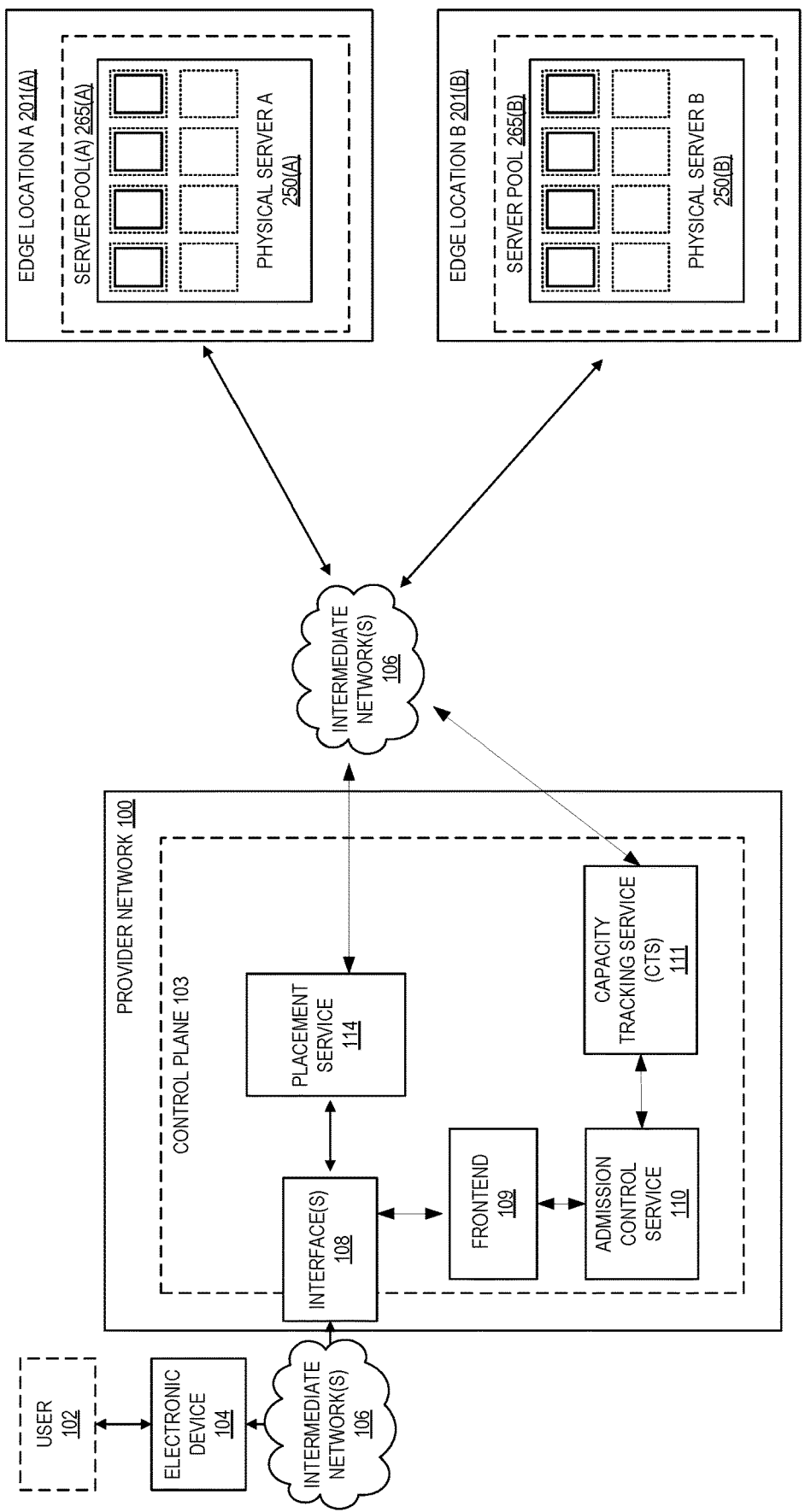
FIG. 2 illustrates an example of an environment including a fleet of hosts housed at one or more remote customer network(s).

FIG. 2 illustrates an example of an environment including a fleet of hosts housed at one or more remote customer network(s). As shown, edge locations 201(A)-(B) include one or more physical servers (for example, including physical servers 250-254 of server pools 265(A)-265(B)) is located at one or more data centers that is separate from the provider network 100. In some embodiments, an edge location offers services, infrastructure, and operating models to virtually any data center or other on-premises facility. In some examples, users can use the same APIs, tools, hardware, and the same functionality across edge locations and resources in a provider network 100 as a hybrid experience. For example, users might desire to use on-premises hardware to support workloads benefiting from low latency or local data processing needs, among other reasons. In some embodiments, the physical servers of the fleet may be purchased or otherwise obtained from the service provider and installed in a customer-managed network, or the physical servers may be obtained from other sources and configured to interface with the provider network 100.

In some embodiments, a provider network 100 enables users to manage the use of virtualized computing resources by multiple users at the fleets of physical servers located within the edge devices 201(A)-(B) in much the same way as if the servers were housed at a data center managed by the service provider. For example, users can use interface(s) 108 to launch virtualized computing resources onto physical servers, to configure custom placement preferences, manage executing resources, among other operations. In this example, a user of the provider network 100 can have even more control over the physical hardware and infrastructure upon which virtualized computing resources execute, while making use of the control plane and other functionality provided by the provider network 100. Thus, similar to the example described in FIG. 1, a request is submitted to an admission control service 110 to accept or deny a request for resources in the edge locations 201(A)-(B).

Figure 3:
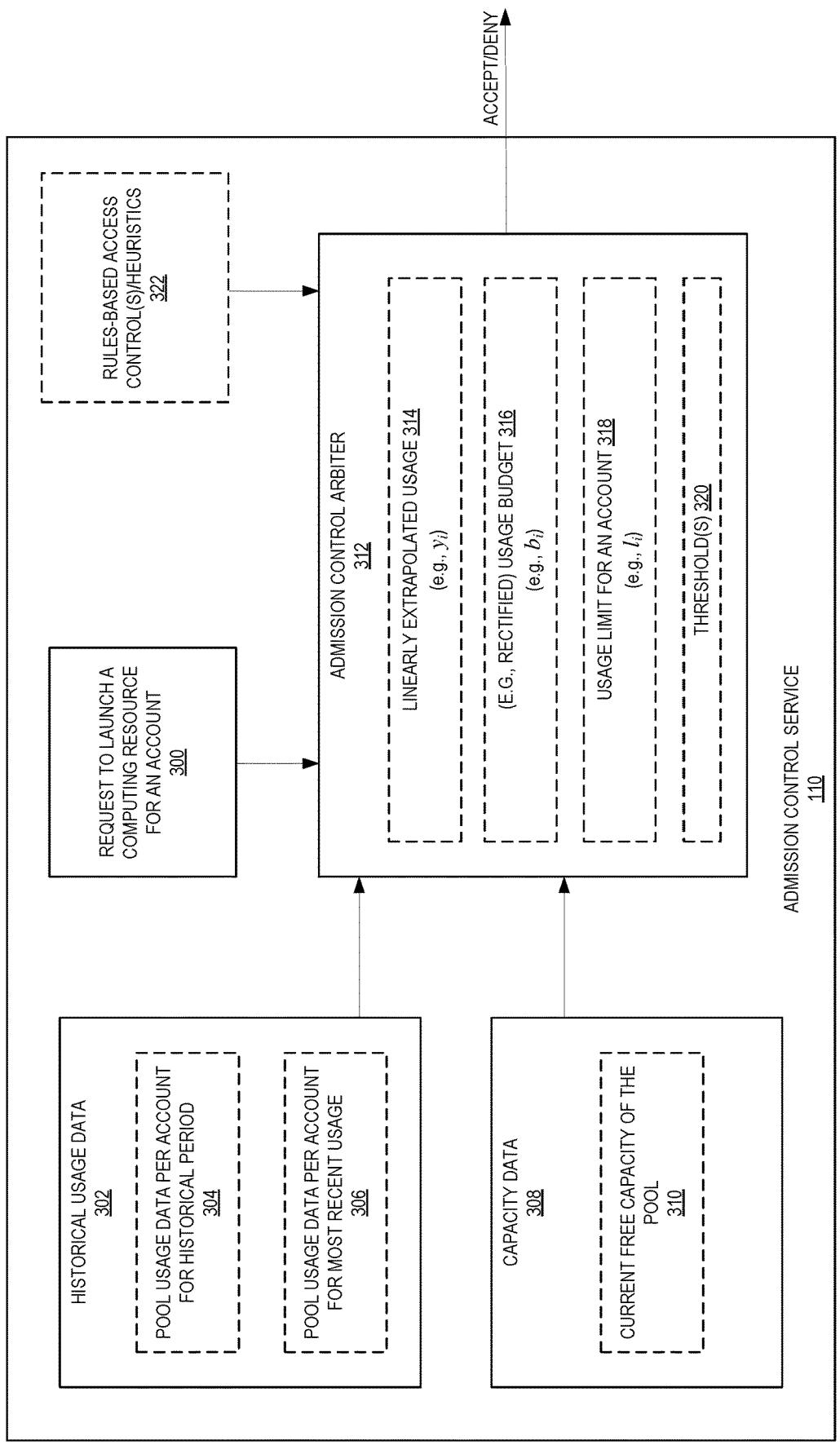
FIG. 3 illustrates embodiments of the admission control service.

FIG. 3 illustrates embodiments of the admission control service. As detailed above, the admission control service 110 may be used to manage resource usage. This illustration shows various aspects of the admission control service 110 and may include one or more rules-based access control(s) or heuristics-based access controls 322 (such as any of the SPICEing mechanisms discussed herein, attribute-based access control (ABAC), access control lists (ACLs), and/or identity and access management (IAM)-style policies) and an admission control arbiter 312.

FIG. 4 illustrates embodiments of the symbols and corresponding explanations that may be utilized by an admission control service. Reference will be made to certain symbols illustrated in table 400.

In reference to both FIGS. 3-4, admission control arbiter 312 utilizes an optimization-based pool protection (e.g., SPICEing mechanism) in embodiments. In certain embodiments, optimization-based pool protection linearly extrapolates the upper tail percentiles of an account's usage to set the account's budget. In one embodiment, this begins with calculating the slope $m_i$ and intercept $w_i$ of such a linear extrapolation $y_i = m_i * e + w_i$. Example ways to perform this follow.

An example of a linear extrapolation with two tail percentiles $p_i(p)$ and $p_i(b)$ is:

$$y_i = \left(\frac{p_i(p) - p_i(b)}{p - b}\right)(e - p) + p_i(p) \tag{1a}$$

Where, $p_i(p)$ and $p_i(b)$ are two tail percentiles calculated from account i's usage during the historical period $\mathcal{H}$. Here, extrapolation parameter (e) and extrapolation along $y_i$ (e.g., (e, $y_i$)) traces out the line between the two points (b, $p_i(b)$) and (p, $p_i(p)$).

Another way to perform the extrapolation to use a set of tail percentiles (e.g., p90, p91, . . . p95) and fit a linear regression through them to obtain the slope and intercept of the extrapolated line.

Yet another way to perform the extrapolation is based on tail statistics of extreme value distributions, and fitting percentiles $p_i(x)$ to log odds scaled percentile indices (e.g., log (x/(1−x))), e.g., where this works better in the non-linear regime of tail percentiles. Certain embodiments thus are mainly influenced by upper tail statistics, e.g., the extrapolation results are not influenced by the middle nor by the opposite (lower) tail of the data. One advantage here is that the extrapolation does not have to fit a distribution over the full range of the data in certain embodiments.

In certain embodiments of optimization-based pool protection, the same extrapolating parameter e is used to extrapolate everyone's (e.g., all accounts using that pool) budgets from their usage distribution's tail percentiles, e.g., where such a method is fair in that it does not provide ad hoc additional budgets to some at the expense of others. For example, if $y_i$ is set as the new usage limit, in one embodiment the budget is $(y_i - u_{i,q})$ where $u_{i,q}$ is the most recent usage (e.g., for the previous planning period) at the beginning of the planning interval. With a low enough e, $(y_i - u_{i,q})$ can be negative. Similarly, with a high enough e, $(y_i - u_{i,q})$ can be higher than the current free capacity of the pool. Hence, certain embodiments herein rectify it as the minimum of $(b_{max}$, maximum of $(b_{min}, (y_i - u_{i,q})))$ where $b_{min}$ and $b_{max}$ are non-negative values specified as inputs. In one embodiment, $b_{min}=0$ and $b_{max}=$maximum capacity factor*$c_q$, where $c_q$ is the free capacity for the entire pool and the maximum capacity factor is a value between 0 and 1 (e.g., 0.8). In some cases, historical usage data 302 includes a drain score $(ds_i)$ that can be used to suitably attenuate the account's budget further, e.g., as budget $b_i=(1-ds_i)$ max $(b_{min}, y_i - u_{i,q})$. In certain embodiments, the usage limit $l_i$ of the account in the pool is the sum of the current usage and budget, i.e., $(u_{i,q} + b_i)$.

For new accounts, past usage can be 0 and therefore their usage limit set to 0, which is a bad experience as that new account will not be able to launch any instances in certain embodiments. To prevent this, certain embodiments herein set a minimum usage limit $l_{min}$ and rectify the usage limit $l_i$ as max$(l_{min}, u_{i,q} + b_1)$. In one embodiment, $l_{min}$ is set to a predetermined limit (e.g., X instances where X is an integer).

The above has discussed setting up the extrapolation $y_i$ and determining the corresponding (e.g., rectified) budget $b_i$ and (e.g., rectified) usage limit $l_i$. In one embodiment, the free parameter (e) (e.g., extrapolating parameter) denoting the extent of the extrapolation does not face any constraint. In another embodiment, the free parameter (e) (e.g., extrapolating parameter) is constrained in how far it can be extrapolated, for example, by determining account i's (e.g., out of a plurality of accounts) projected consumption in the planning interval $\mathcal{T}$ and out of this projected consumption, only requests up to $b_i$ will be satisfied. Certain embodiments herein sum up the truncated forecasted consumption that will be satisfied under the set budgets and constrain the sum to be less than the free capacity $c_q$. An example of this is the continuous pool protection (CPP) program (e.g., set of equations) discussed below as (2a)-(2i).

$$(Opt - CPP) \max \sum_{i=1}^{N} b_i \quad (2a)$$

$$\text{subject to} \quad y_i = m_i \epsilon + w_i \quad \forall i \in [N] \quad (2b)$$

$$b_i = (1 - ds_i)\min \quad \forall i \in [N] \quad (2c)$$

-continued $$(b_{max}, \max(b_{min}, y_s - a_{i,q}))$$

$$l_i = \max(l_{min}, u_{i,q} + b_i) \quad \forall i \in [N] \quad (2d)$$

$$\sum_{i=1}^{N} \min(b_i, d_i) \leq e_q \quad (2e)$$

$$e \geq 0 \quad (2f)$$

$$b_i \geq 0 \quad \forall i \in [N] \quad (2g)$$

$$l_i \geq 0 \quad \forall i \in [N] \quad (2h)$$

$$(2i)$$

Where [N] is the number of accounts per pool, e.g., accounts {1 . . . N}. In one embodiment, the set of equations are solved as a system of equations, for example, by admission control service 110 (e.g., admission control arbiter 312). In certain embodiments, $l_i$ is the usage limit for account i as determined for a planning interval, e.g., with $l_i$ used as threshold to deny (e.g., SPICE) or allow a request.

In one embodiment, the input parameter $b_{min}$ is set to 0. In this case, $b_i=0$ (e.g., corresponding to some sufficiently low e and $y_i$) suffices to satisfy the capacity constraint in certain embodiments, e.g., where a positive $b_{min}$ accommodates a positive forecasted consumption for all accounts demanding it for which the capacity might not exist at the current time.

In certain embodiments, a limitation of program (2) is that the linear extrapolation $y_i$ of tail percentiles is not a specific percentile of the account's distribution. For example, extrapolation $y_i$ for the same value of the free parameter e might correspond to p96 in one account and p99 in another account, e.g., depending upon the slope $m_i$, e.g., which in turn depends on the extent of non-linearity in the account usage cumulative distribution function (CDF) tail. Thus, if it is desired to accommodate the same usage percentile for every account in budget setting, certain embodiments of admission control service 110 (e.g., admission control arbiter 312) can solve program (3) discussed below (e.g., a sequence of equations described in (3)) by decreasing the chosen percentile level e corresponding to usage percentiles $p_i(e)$ until discovering the highest percentile level e* that leads to feasibility. For example, where account-level percentile extrapolations such as $\hat{p}_i(101)$; $\hat{p}_i(102)$; etc. beyond current $\hat{p}_i$ (100) usages are to be provided if the limit allocations are to go beyond current account peaks. Such extrapolations can use the methods for tail percentile extrapolation described at the beginning of this disclosure.

$$\max \quad 0 \quad (3a)$$

$$\text{subject to} \quad b_i = (1 - ds_i)\min(b_{max}, \max(b_{min}, p_i(e) - u_{i,q})) \quad (3b)$$

$$l_i = \max(l_{min}, u_{i,q} + b_i) \quad (3c)$$

$$\sum_{i=1}^{N} \min(b_i, d_i) \leq c_q \quad (3d)$$

In certain embodiments, other constraints may be implemented. In one embodiment, the optimization program sets budgets for currently available capacity $c_q$. In one embodiment, there is a throttler $b_{max}$=max capacity factor*$c_q$. Certain values of max capacity factor (e.g., 0.8) ensure that no single account can consume more than that amount (e.g., 80%) of the pool's capacity in a single snapshot's duration.

This can seem very generous but certain pools have flagship account(s) that can drive most of the usage/launch activity in the pool. Once a budget less than or equal to max capacity factor*$c_q$ has been consumed, budgets recalculated with the newly available reduced capacity will be revised downwards and protect the pool more aggressively in certain embodiments. However, other embodiments provide for a more proactive approach with certain (e.g., large) requests coming from a single account. In this case, certain embodiments herein calculate budgets with capacity $c_q$ as well as $c_q-R$, where R is the request size being evaluated, e.g., where if serving the request sets budgets for one or more (e.g., a threshold number of) other accounts to 0 and/or causes the expectation that one or more (e.g., a threshold number of) accounts will hit the budgets during their usage (min($b_i, \hat{d}_i$)=$bi$), where $\hat{d}_i$ is the forecasted account usage (e.g., forecasted demand), embodiments herein can deny a request proactively instead of waiting for it to reduce the capacity and revise budgets downwards. Forecasted demand may capture a diurnality, a seasonality, a growth over time, or any combination of the above (e.g., on a per account granularity). This proactive evaluation need not be done for every request, e.g., only for certain (e.g., major) requests that exceed a (e.g., request size) threshold, such as R≥min capacity factor*$c_q$. For example, where a min capacity factor=0.2 would indicate that any request larger than 20% of the current capacity would be evaluated proactively for the budget issues it may cause to other accounts. In shallow pools, e.g., where a large request may not cause many other accounts to be affected, large requests that deplete the pool are acceptable in certain embodiments. In other embodiments, e.g., in deeper pools, a large request may affect many other accounts and therefore be proactively denied. The currently available capacity may be the currently available capacity in a resource pool of the cloud provider network and/or a potential capacity that can be replenished into the resource pool from other donating resource pools of the cloud provider network with excess capacity, for example, where donations between resource pools are plausible because their virtualized cloud resources are built on the same underlying hardware (e.g., physical servers).

Setting guardrails (e.g., minimum threshold and/or maximum threshold, such as $e_{min} \leq e \leq e_{max}$) for the usage extrapolation from tail percentiles is helpful in some scenarios. For example, if no past usages are present (e.g., in a new pool or region), the linear extrapolation will face a capacity constraint that will never be tight no matter how high the budgets in certain embodiments. Certain embodiments include a maximum value constraint ($e_{max}$) on parameter e. As another use case, e.g., in RBAC-like linear extrapolation, it may be desirable to constrain parameter e≥p to ensure that the extrapolation $y_i(e)$ is always higher than the higher tail percentile $p_i(p)$ used in the extrapolation. However, not including the constraint e≥p leads to an interesting protective behavior in certain embodiments as the pool drives further into safety stock. For example, where capacity C depletes, it forces budgets $b_i$ downwards through constraint (2e). From constraints (2b) and (2c), a downward pressure on $b_i$ forces $y_i$, and correspondingly e, downwards. For accounts with high usage, $y_i$ will dip below current usage $u_{i,q}$ and their budget $b_i$ set to safety net $b_{min}$ in certain embodiments. Accounts with lower current usage will still be able to take from the pool until repeatedly lowering e sets everyone's budget to $b_{min}$ in certain embodiments. For example, where setting the input parameter burin to a certain (e.g., very low but not zero) value essentially drops the account's usage to a trickle, and setting $b_{min}$=0 turns off the tap for accounts whose usage $u_{i,q}$ exceeds extrapolation $y_i$, e.g., as long as the budgets are not overridden via $l_{min}$. Thus, if the pool is tight on capacity, setting $b_{min}$ to 0 in certain embodiments will effectively cut off any additional usage for accounts with very high usage, while keeping the tap open for accounts that have not racked up a high usage. This is an advantageous behavior and one that RBAC does not allow by setting e (e.g., e=120), and therefore allowing draining of the pool even in safety stock mode.

If account-level forecasted usage change (e.g., increase) $\hat{d}_i$ is not available, it can be calculated from the empirical distribution of seasonal account-level usage growths in a past time period (e.g., a few weeks). For example, where cloud resource pools are heavily oversubscribed, and therefore past resource consumption under assigned budgets is to be used to place the resource constraint instead of assuming that the budgets will certainly be used by the accounts to which they are assigned and unavailable to other accounts. In one embodiment, an available demand forecast $\hat{d}_i$ could be used directly instead of looking at the empirical distribution of $d_{i,k}$ from comparable planning intervals in the past.

It may be desirable to include the following constraint to impose individual fairness, e.g., similar accounts should have similar budgets:

$$\left| b_i - \frac{1}{K} \sum_{j \in N_{iK}} b_j \right| \leq \epsilon b_i$$

However, adding it to the program can lead to utility loss by driving down e to meet the constraint. For example, where at sufficiently low e, the extrapolation $y_i$ will be low enough that all accounts' budgets will hit the safety net $b_{min}$ in constraint (2c) leading to a trivial case of counterfactual fairness. Certain embodiments herein keep the constraint out of the program, for example, but monitor it for violations, and allow for other actions to be taken in response, e.g., sending an indication to resolve budget excesses of accounts with large usages and budgets. Alternatively, embodiments herein can penalize its violation in the objective function. The cross-validation can search over all positive values for the optimal K. Another approach is to weigh the penalty for budget disparities between neighbors inversely proportional to the distance between them, for example, using a kernel, such as a kernel density estimation or a nonparametric Nadaraya-Watson estimator.

In one embodiment, $b_i$=(1−$ds_i$) min ($b_{max}$, max($b_{min}$, $y_i-u_{i,q}$)) might sometimes be (e.g., very) large if the current usage $u_{i,q}$ is (e.g., much) lower currently than the extrapolated usage $y_i$. Other possible constraints are $bi$=(1−$ds_i$) min($b_{max}$, max($b_{min}$, $y_i-p_{i100}$)) or $b_i$=(1−$ds_i$) min($b_{max}$, max ($b_{min}$, $y_i-p_i(p)$)) which calculates the budget between the extrapolation and the current peak $p_i(100)$ or outlier-trimmed peak $p_i(p)$, respectively. The budget may then be transferred to the limit $l_i$ as ($u_{i,q}+b_i$). This disallows big budgets for accounts that are currently much farther down in their usage compared to their historical peak and therefore have a lot of room to scale. This rectified budget can also be conditionally applied only in the protective safety-stock mode.

For demands that are certain to appear over longer horizons than planning intervals (e.g., of a few hours) corresponding to rebuild times (e.g., demand that appears on a Monday), a multi-stage optimization may be utilized where the optimization-based pool protection gives out the capacity only if the intended usage has a lifetime such that the capacity will be returned for other regular use over the longer planning horizon.

In certain embodiments, the optimization-based pool protection is used for on-demand requests, e.g., but may be used for capacity reservation requests.

Turning again to FIG. 3, historical usage data 302 may be supplied, e.g., indicating pool usage data per account for a historical period 304 and/or indicating pool usage data per account for a most recent usage 306. Capacity data 308 may be supplied, e.g., indicating the current free capacity of the pool 310 (e.g., at the time optimization-based pool protection is performed).

In certain embodiments, for and/or in response to a request 300 to launch a computing resource for an account, admission control arbiter 312 is to perform optimization-based pool protection, e.g., constrained by one or more thresholds 320. In one embodiment, admission control arbiter 312 determines a linearly extrapolated usage 314 (e.g., $y_i$), (e.g., rectified) usage budget 316 (e.g., $b_i$), and/or a usage limit for an account 318 (e.g., $l_i$), for example, according to program (2) discussed herein. In certain embodiments, usage limit for an account 318 (e.g., $l_j$) is compared against the usage (e.g., budget) requested by request 300, and the computing resource(s) to service the request is launched (e.g., "accept") when the budget for the computing resource(s) is less than or equal to the usage limit 318 and the computing resource(s) to service the request is not launched (e.g., "deny") when the budget for the computing resource(s) is greater than the usage limit 318.

Figure 5:
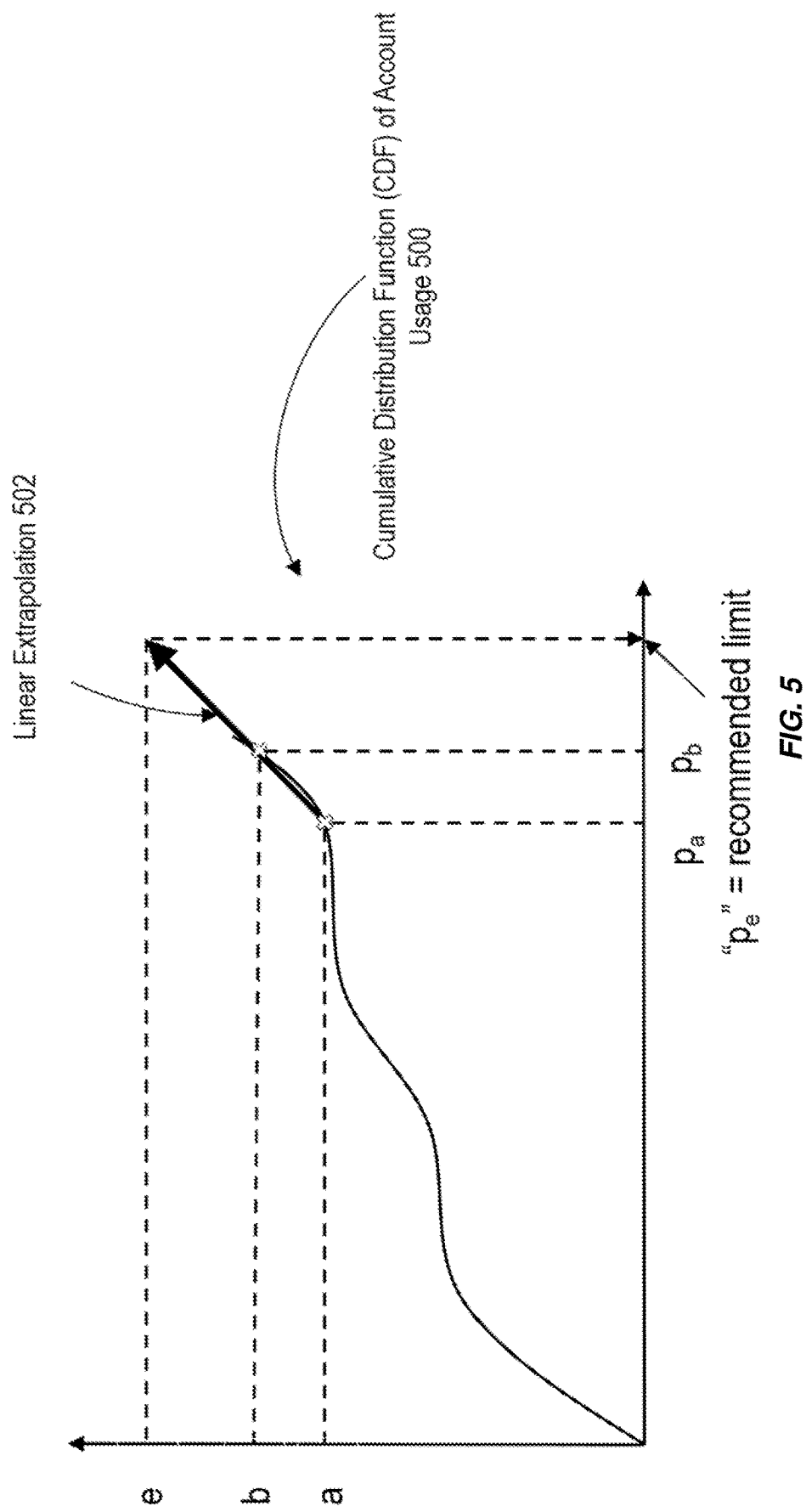
FIG. 5 illustrates a cumulative distribution function of an account usage and a linear extrapolation.

FIG. 5 illustrates a cumulative distribution function (CDF) 500 of an account usage and a linear extrapolation 502. Usage values (a) and (b) correspond to usages (e.g., of computing resources) and $p_a$ and $p_b$ are the percentages for those usage values, respectively (for example, where $p_a$ is p90 and $p_b$ is p95). The linear extrapolation 502 for those points (marked with Xs) on the CDF allows an extrapolation to a usage value of "e" corresponding to "percentage e" ($p_e$), e.g., e160.

Figure 6:
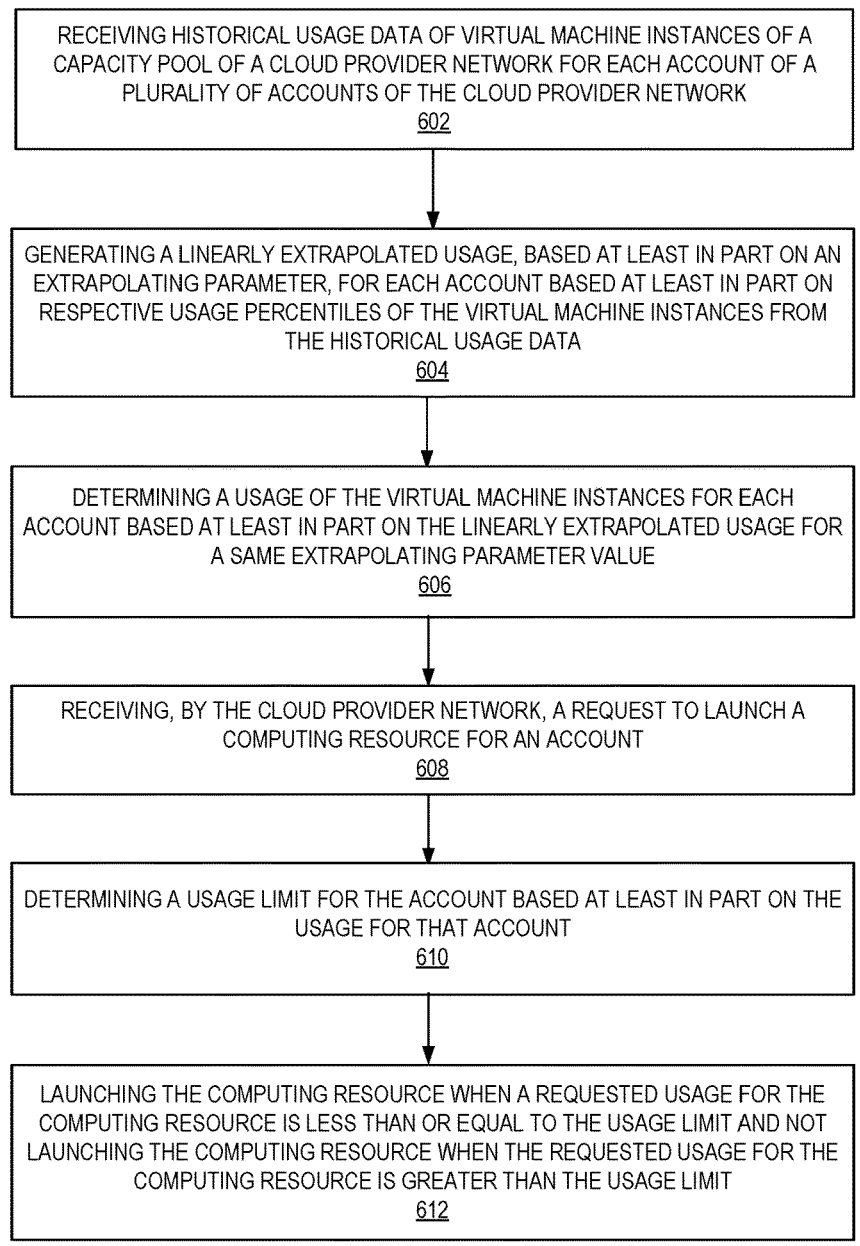
FIG. 6 is a flow diagram illustrating operations of a method for optimization-based pool protection for a cloud provider network in determining whether or not to allow a launch request according to some embodiments.

FIG. 6 is a flow diagram illustrating operations 600 of a method for optimization-based pool protection for a cloud provider network in determining whether or not to allow a launch request according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the admission control service 110 of the other figures.

The operations 600 include, at block 602, receiving historical usage data of virtual machine instances of a capacity pool of a cloud provider network for each account of a plurality of accounts of the cloud provider network. The operations 600 further include, at block 604, generating a linearly extrapolated usage, based at least in part on an extrapolating parameter, for each account based at least in part on respective usage percentiles of the virtual machine instances from the historical usage data. The operations 600 further include, at block 606, determining a usage of the virtual machine instances for each account based at least in part on the linearly extrapolated usage for a same extrapolating parameter value. The operations 600 further include, at block 608, receiving, by the cloud provider network, a request to launch a computing resource for an account. The operations 600 further include, at block 610, determining a usage limit for the account based at least in part on the usage for that account. The operations 600 further include, at block 612, launching the computing resource when a requested usage for the computing resource is less than or equal to the usage limit and not launching the computing resource when the requested usage for the computing resource is greater than the usage limit.

Figure 7:
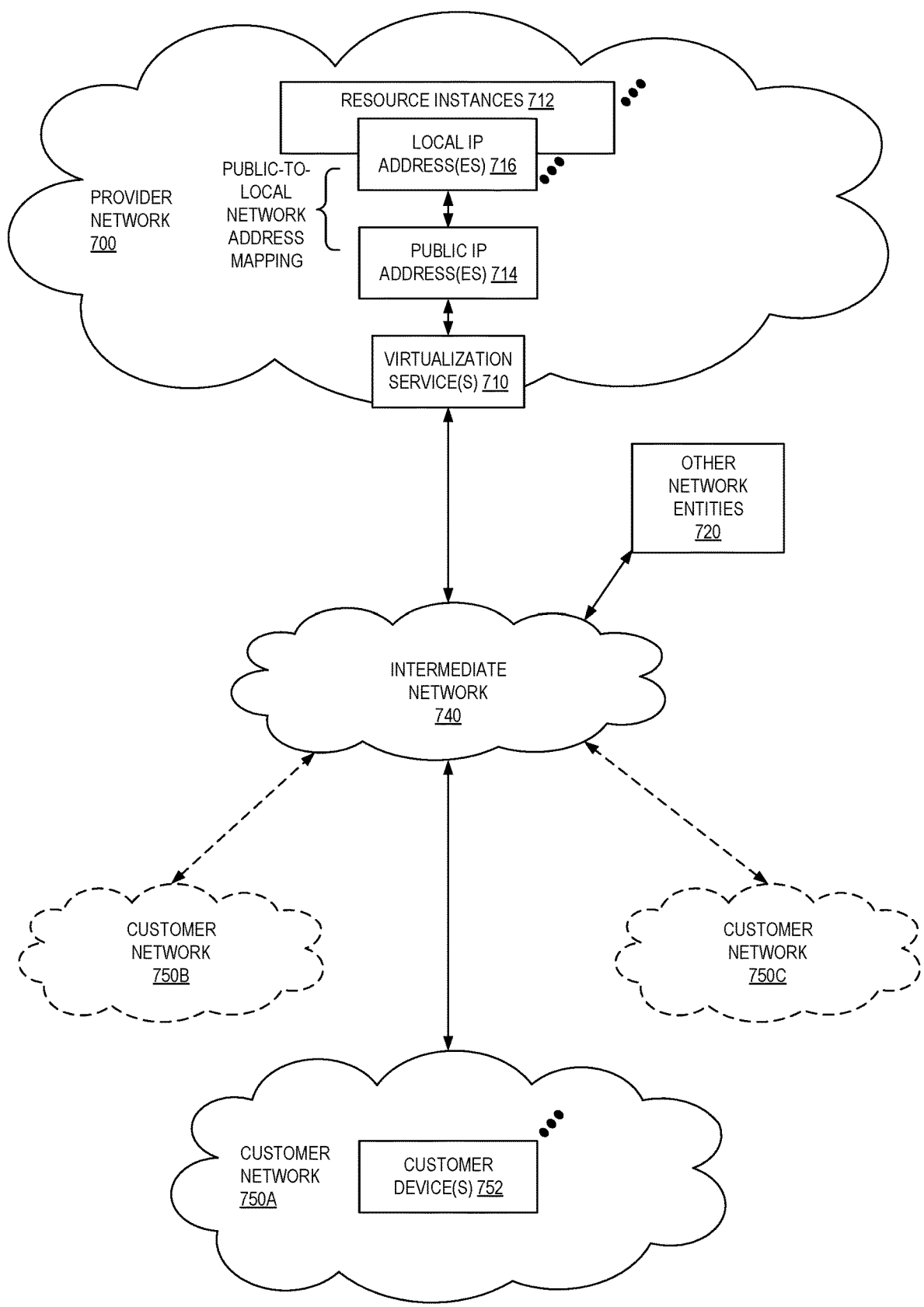
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
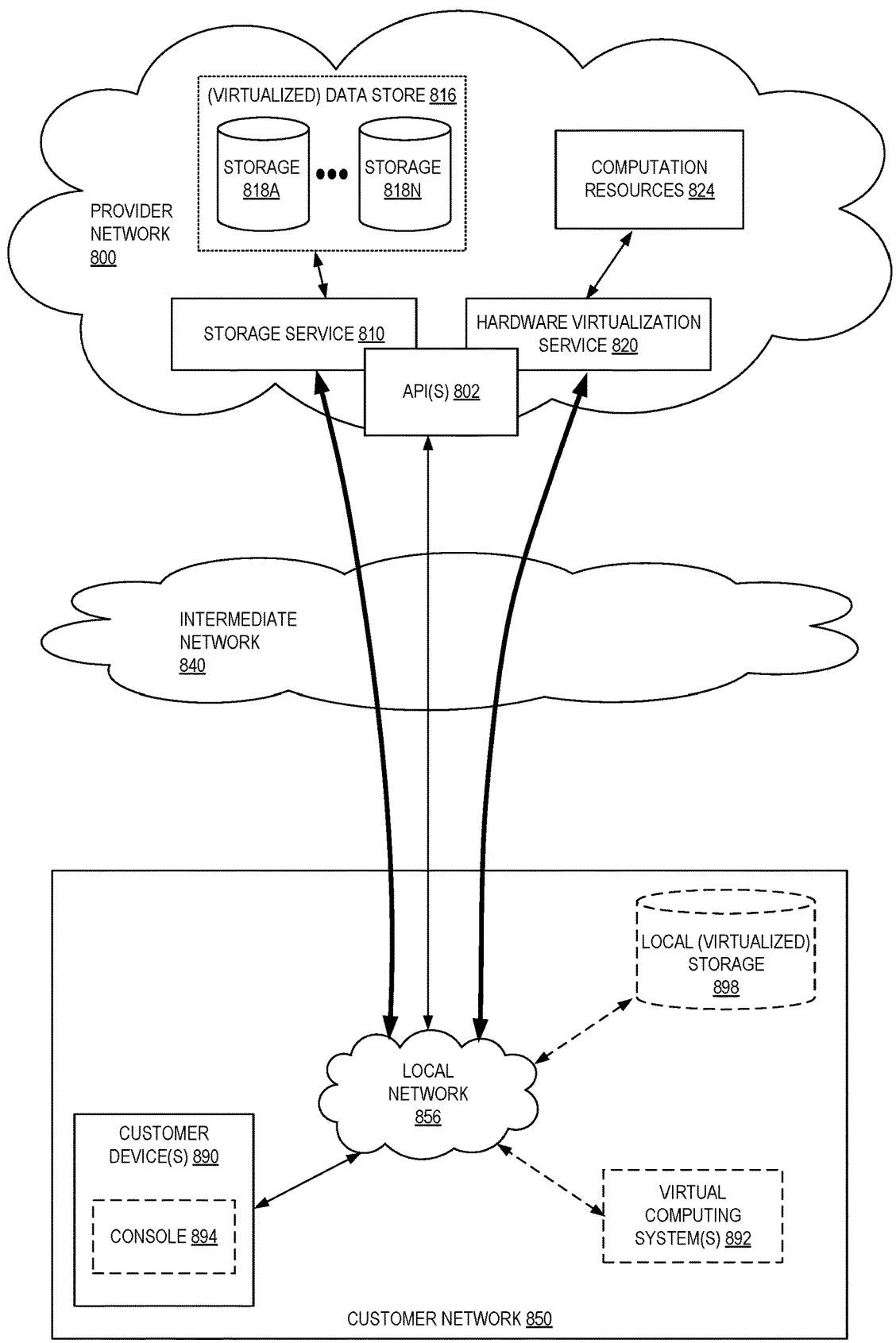
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple compute resources 824 (e.g., compute instances such as VMs) to customers. The compute resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the compute resources 824 to public Internet destinations, and from public Internet sources to the local IP addresses of compute resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative Systems

Figure 9:
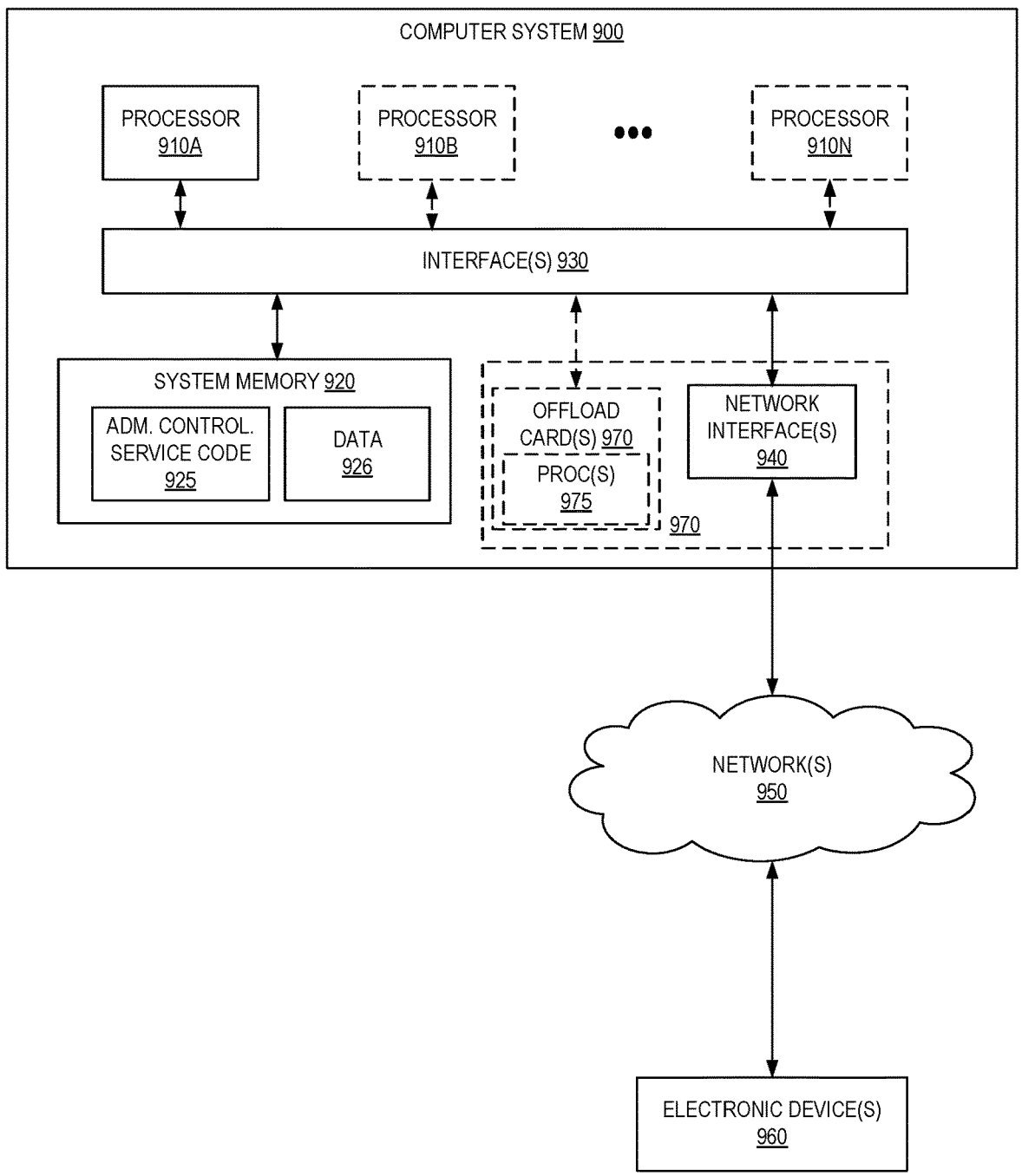
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as admission control service code 925 (e.g., executable to implement, in whole or in part, the admission control service 110) and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing, or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute resources such as compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving historical usage data of virtual machine instances of a capacity pool of a cloud provider network for each account of a plurality of accounts of the cloud provider network;
generating a linearly extrapolated usage, based at least in part on an extrapolating parameter, for each account based at least in part on respective usage percentiles of the virtual machine instances from the historical usage data;

determining a usage of the virtual machine instances for each account based at least in part on the linearly extrapolated usage for a same extrapolating parameter value;

receiving, by the cloud provider network, a request to launch a computing resource for an account;

determining a usage limit for the account based at least in part on the usage for that account; and launching the computing resource when a requested usage for the computing resource is less than or equal to the usage limit and not launching the computing resource when the requested usage for the computing resource is greater than the usage limit.

2. The computer-implemented method of claim 1, wherein the determining the usage is also based at least in part on a forecasted demand for the account from the historical usage data.

3. The computer-implemented method of claim 2, wherein the forecasted demand captures a diurnality, a seasonality, and a growth over time for the account.

4. A computer-implemented method comprising:

receiving historical usage data of computing resources of a cloud provider network for each account of a plurality of accounts of the cloud provider network;

generating an extrapolated usage, based at least in part on an extrapolating parameter, for each account based at least in part on respective usage values of the computing resources from the historical usage data;

determining a usage of the computing resources for each account based at least in part on the extrapolated usage for a same extrapolating parameter;

receiving, by the cloud provider network, a request to launch a computing resource for an account;

determining a usage limit for the account based at least in part on the usage for that account; and launching the computing resource when a requested usage for the computing resource is less than or equal to the usage limit and not launching the computing resource when the requested usage for the computing resource is greater than the usage limit.

5. The computer-implemented method of claim 4, wherein the determining the usage is also based at least in part on a forecasted demand for the account from the historical usage data.

6. The computer-implemented method of claim 5, wherein the forecasted demand captures a diurnality, a seasonality, and a growth over time for the account.

7. The computer-implemented method of claim 5, wherein the determining the usage is also based at least in part on a currently available capacity in a resource pool of the cloud provider network or a potential capacity that can be replenished into the resource pool from other donating resource pools of the cloud provider network with excess capacity.

8. The computer-implemented method of claim 4, wherein the determining the usage is also based at least in part on a currently available capacity in a resource pool of the cloud provider network or a potential capacity that can be replenished into the resource pool from other donating resource pools of the cloud provider network with excess capacity.

9. The computer-implemented method of claim 4, wherein the determining the usage is also based at least in part on a maximum capacity factor that ensures no single account consumes more than the maximum capacity factor of computing resources of the cloud provider network.

10. The computer-implemented method of claim 4, wherein the determining the usage limit is also based at least in part on a minimum usage limit of the computing resources of the cloud provider network by the account.

11. The computer-implemented method of claim 4, further comprising not launching the computing resource when the requested usage for the computing resource is to cause a usage for computing resources for another account of the plurality of accounts of the cloud provider network to be set to zero or fall below a minimum usage threshold.

12. The computer-implemented method of claim 11, further comprising not launching the computing resource when the requested usage for the computing resource is to cause a usage for computing resources for another account of the plurality of accounts of the cloud provider network to be below a minimum usage value.

13. The computer-implemented method of claim 12, further comprising, in response to determining that the requested usage for the computing resource exceeds a request size threshold, determining whether the requested usage for the computing resource causes the usage for computing resources for another account of the plurality of accounts of the cloud provider network to be set to zero or fall below the minimum usage threshold, or determining whether the requested usage for the computing resource causes the usage for computing resources for another account of the plurality of accounts of the cloud provider network to be below the minimum usage value.

14. The computer-implemented method of claim 4, wherein the generating the extrapolated usage is in response to an update of the respective usage values of the computing resources from the historical usage data.

15. A system comprising:

a fleet of physical servers that host computing resources of a cloud provider network; and a control plane service of the cloud provider network implemented by one or more electronic devices, the control plane service including instructions that upon execution cause the control plane service to perform operations comprising:

receiving historical usage data of the computing resources of the cloud provider network for each account of a plurality of accounts of the cloud provider network, generating an extrapolated usage, based at least in part on an extrapolating parameter, for each account based at least in part on respective usage values of the computing resources from the historical usage data, determining a usage of the computing resources for each account based at least in part on the extrapolated usage for a same extrapolating parameter, receiving, by the cloud provider network, a request to launch a computing resource for an account, determining a usage limit for the account based at least in part on the usage for that account, and launching the computing resource when a requested usage for the computing resource is less than or equal to the usage limit and not launching the computing resource when the requested usage for the computing resource is greater than the usage limit.

16. The system of claim 15, wherein the instructions upon execution cause the control plane service to perform operations wherein the determining the usage is also based at least in part on a forecasted demand for the account from the historical usage data.

17. The system of claim 16, wherein the instructions upon execution cause the control plane service to perform operations wherein the forecasted demand captures a diurnality, a seasonality, and a growth over time for the account.

18. The system of claim 15, wherein the instructions upon execution cause the control plane service to perform operations wherein the determining the usage is also based at least in part on a maximum capacity factor that ensures no single account consumes more than the maximum capacity factor of computing resources of the cloud provider network.

19. The system of claim 15, wherein the instructions upon execution cause the control plane service to perform operations wherein the determining the usage limit is also based at least in part on a most recent usage of the computing resources of the cloud provider network by the account.

20. The system of claim 15, wherein the instructions upon execution cause the control plane service to perform operations wherein the generating the extrapolated usage is in response to an update of the respective usage values of the computing resources from the historical usage data.

* * * * *